US010099768B2

(12) United States Patent
Christenson et al.

(10) Patent No.: US 10,099,768 B2
(45) Date of Patent: Oct. 16, 2018

(54) TELESCOPING AIRCRAFT PANEL DOOR

(71) Applicant: B/E Aerospace, Inc., Wellington, FL (US)

(72) Inventors: Justin C. Christenson, Everett, WA (US); Graydon E. Loar, Seattle, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/234,684

(22) Filed: Aug. 11, 2016

(65) Prior Publication Data

US 2017/0001704 A1 Jan. 5, 2017

Related U.S. Application Data

(63) Continuation of application No. 14/754,620, filed on Jun. 29, 2015, now Pat. No. 9,440,727.

(60) Provisional application No. 62/023,530, filed on Jul. 11, 2014.

(51) Int. Cl.
*E05D 15/22* (2006.01)
*B64C 1/14* (2006.01)
*E06B 3/50* (2006.01)
*E05F 17/00* (2006.01)
*E05D 15/58* (2006.01)
*B64D 11/02* (2006.01)

(52) U.S. Cl.
CPC .......... *B64C 1/1423* (2013.01); *B64C 1/1407* (2013.01); *B64D 11/02* (2013.01); *E05D 15/58* (2013.01); *E05F 17/00* (2013.01); *E06B 3/5009* (2013.01); *E05Y 2800/122* (2013.01)

(58) Field of Classification Search
CPC ............................ B64C 1/1407; E06B 3/5009
USPC .................. 49/163, 164, 166, 168, 188, 189
See application file for complete search history.

(56) References Cited

U.S. PATENT DOCUMENTS 178,247 A * 6/1876 Linscott .................. F21V 21/08
248/214
704,887 A * 7/1902 Low ........................ E05F 17/00
160/181
787,640 A * 4/1905 Robinson ..................... 160/210
(Continued)

FOREIGN PATENT DOCUMENTS

DE 2322907 A1 11/1974
DE 25 02 765 A1 7/1976
(Continued)

OTHER PUBLICATIONS

International Search Report dated Sep. 21, 2015, in PCT/US2015/039598, 3 pages.

(Continued)

*Primary Examiner* — Jerry E Redman
(74) *Attorney, Agent, or Firm* — Donna P. Suchy

(57) ABSTRACT

A telescoping aircraft door is disclosed having first and second panels that slide relative to one another to extend and retract as the door closes and opens, respectively. The first panel is hinged to the door frame in a traditional manner, and the second panel is fixed to the door frame by a linkage that limits the arc of the second panel. By selecting the location and length of the linkage, the relative movement of the two panels can be predictably controlled to reduce the depth of the door when closed and the length of the door when opened.

20 Claims, 4 Drawing Sheets

(56) References Cited

U.S. PATENT DOCUMENTS

| | | | | |
|---|---|---|---|---|
| 3,029,868 | A * | 4/1962 | Ogburn | E05D 15/264 160/118 |
| 3,101,777 | A * | 8/1963 | Sherron | E04H 1/14 16/90 |
| 3,318,047 | A * | 5/1967 | Carson | E06B 3/50 49/141 |
| 4,305,227 | A * | 12/1981 | Georgelin | E05D 15/48 49/141 |
| D281,575 | S * | 12/1985 | Chap | D6/325 |
| 5,242,005 | A * | 9/1993 | Borgardt | E05D 15/264 160/118 |
| 5,373,979 | A * | 12/1994 | Moore | B60R 7/10 223/1 |
| 5,392,834 | A * | 2/1995 | Borgardt | E06B 3/481 160/118 |
| 5,829,725 | A * | 11/1998 | Russo | B60R 7/10 248/304 |
| 5,832,980 | A * | 11/1998 | Cianciolo | E05D 15/58 160/197 |
| 6,061,961 | A * | 5/2000 | Rupe | E05D 15/1042 49/147 |
| 6,170,195 | B1 * | 1/2001 | Lim | E05D 15/58 49/141 |
| 6,422,287 | B1 * | 7/2002 | Wilke | E05D 15/58 160/195 |
| 7,950,439 | B2 * | 5/2011 | Anderson | E05D 15/58 160/195 |
| 8,096,342 | B2 * | 1/2012 | Scruggs | E05D 15/0626 160/211 |
| 8,925,248 | B2 * | 1/2015 | Maruyama | B60J 5/047 296/146.11 |
| 9,057,216 | B2 * | 6/2015 | Bortoluzzi | E05D 15/58 |
| 9,440,727 | B2 * | 9/2016 | Christenson | B64D 11/02 |
| 9,637,970 | B1 * | 5/2017 | Rendon, Jr. | E06B 3/509 |
| 2006/0197357 | A1 * | 9/2006 | Catania | B60J 5/06 296/155 |
| 2010/0208433 | A1 * | 8/2010 | Heimann | H04Q 1/10 361/724 |
| 2010/0270898 | A1 * | 10/2010 | Haab | E05D 15/0634 312/323 |
| 2011/0011003 | A1 * | 1/2011 | Vogel | E05F 17/004 49/399 |
| 2012/0073205 | A1 * | 3/2012 | Hamaker | E06B 3/5072 49/163 |
| 2012/0255230 | A1 * | 10/2012 | Smith | E05D 15/48 49/257 |
| 2015/0052835 | A1 * | 2/2015 | Falter | E06B 5/113 52/204.1 |
| 2015/0068026 | A1 * | 3/2015 | Rojo | H04Q 1/112 29/593 |
| 2017/0001704 | A1 | 1/2017 | Christenson et al. | |

FOREIGN PATENT DOCUMENTS

| | | |
|---|---|---|
| KR | 101693353 B1 | 1/2017 |
| WO | 2008/090447 A2 | 7/2008 |

OTHER PUBLICATIONS

U.S. Office Action dated Sep. 1, 2017.
U.S. Notice of Allowance on U.S. Appl. No. 15/406,690 dated Jan. 19, 2018, 7 pages.
International Search Report and Written Opinion on International Patent Application No. PCT/US2018/013328 dated Apr. 30, 2018. 13 pages.

* cited by examiner

TELESCOPING AIRCRAFT PANEL DOOR

CROSS-REFERENCES TO RELATED APPLICATIONS

This application is a continuation of and claims priority to U.S. application Ser. No. 14/754,620 filed Jun. 29, 2015. U.S. application Ser. No. 14/754,620 claims priority to U.S. Application No. 62/023,530, filed Jul. 11, 2014, the content of which is incorporated by reference herein in its entirety.

BACKGROUND

The interior of a commercial aircraft typically includes several compartments, such as crew changing quarters, lavatories, galleys, and the like. In each case, ingress and egress of these compartments are typically through a door or panel that walls off the compartment when in use. Doors of this type include both sliding doors and swinging doors. Each of these types of doors have inherent drawbacks. Namely, swinging or hinged doors occupy a large amount of cross-aisle space when the door is open and the design of the aircraft must account for the free space needed to accommodate the arc of the door as it transitions open. Conversely, sliding doors occupy twice the depth space to achieve the same closure area. Both of these shortcomings add unnecessary weight and/or occupy space that could be used for better purposes. Thus, there is a need for an improved door for use in an aircraft that overcomes the shortcomings of the prior art.

SUMMARY OF THE INVENTION

The present invention is directed to a two panel door having a first panel hinged to the door frame and a second panel coupled to the frame by a linkage that includes a rotating arm. The rotating arm reduces the arc traveled by the second panel (and thus the door in general) and results in a door with less width, weight, and covers the same area without unduly monopolizing cross-aisle space. The door when opened is roughly half as wide as when it is closed, allowing for a more narrow aisle or, alternatively, leaving more aisle space available for cross traffic. In narrow aisle aircraft, the use of a bi-fold door can be replaced with the present invention.

DETAILED DESCRIPTION OF THE PREFERRED EMBODIMENTS

Figure 1:
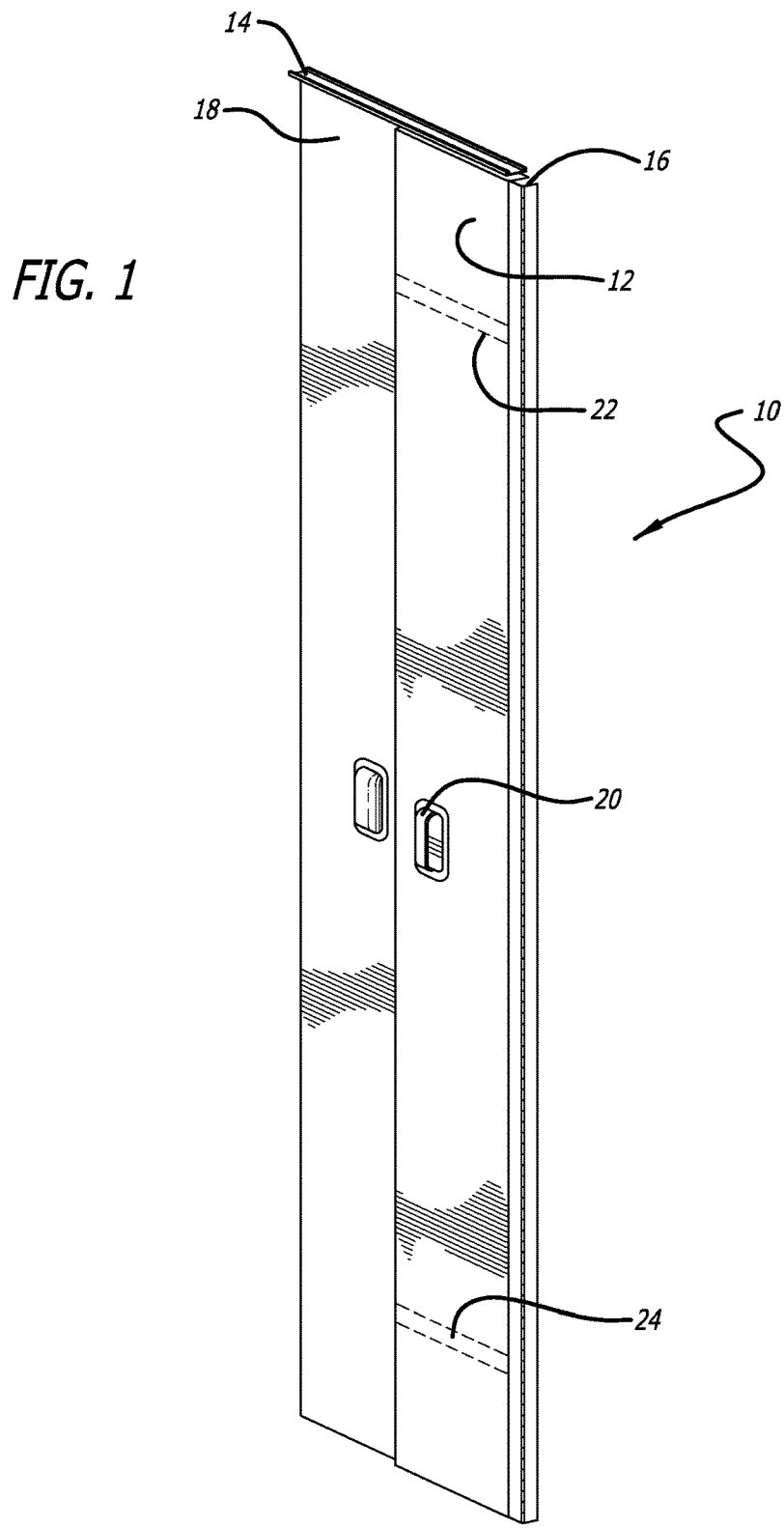
FIG. 1 is an elevated perspective view of a first embodiment of the present invention.

FIG. 1 illustrates a first preferred embodiment of a telescoping door of the present invention in which a door for an aircraft, vessel, or other vehicle is disclosed. The door 10 of the present invention comprises at least two panel, including a first panel 12 connected to the door frame 14 via a hinge or set of hinges, such as the piano hinge 16, and a second panel 18 that is slidingly engaged with the first panel 12 and extends therefrom. The first panel 12 is attached to the frame 14 in a pivoting arrangement and a width of the first panel is selected to be sufficient to approximately span one half of the width of the doorway. A handle or release lever 20 is provided in the first panel 12 to assist in opening and closing the door 10. The first panel 12 is also provided with preferably two horizontal grooves or slots 22,24, as set forth more fully below. The operation of the first panel 12 is relatively simply, swinging about its fixed point on the hinge or hinges 16 between on open position and a closed position, where the closed position locates the first panel 12 in the doorway where it occupies approximately one half of the door frame area.

The second panel 18 of the telescoping door 10 is attached to the first panel through a wheel 23 and slot arrangement where the wheels are captured on tracks in the horizontal slots 22,24 or grooves, such that the second panel 18 is carried by the wheels 24 to move relative to the first panel 12 in a sliding or telescoping relationship. It should be noted that the wheels 23 of the second panel 18 can be replaced with other structure that allow the second panel 18 to glide or extend outward from the first panel 12 without undue friction or resistance (e.g., drawer slides) and is not limited to any particular mode of sliding/rolling/shifting engagement. If the second panel 18 is sized to be approximately the same width as the first panel 12, when fully extended away from the first panel 12 (in the direction away from the hinged connection on the first panel) the second panel 18 will cooperate with the first panel 12 to completely cover and occlude the door frame 14 in a reliable manner. That is, the first and second panels 12,18 have a combined width that when fully extended close the doorway when the door 10 is closed by virtue of the full extension of the second panel 18 along and within the horizontal grooves or slots 22,24 of the first panel 12.

To extend and retract the second panel 18 from the first panel 12 as discussed above, the second panel 18 is connected along an upper edge 26 to the door frame 14 by a linkage such as a rigid bar 28. The bar 28 is fixed at a first end 30 to the second panel 18 at an inner edge 32 that is closest to the piano hinge 16, and is fixed at a second end 34 in a pivoting connection to the door frame approximately at approximately one quarter of the distance between the sides of the door frame, closest to the side 36 with the hinge that connects the first panel 12 (See FIG. 2).

Figure 2A:
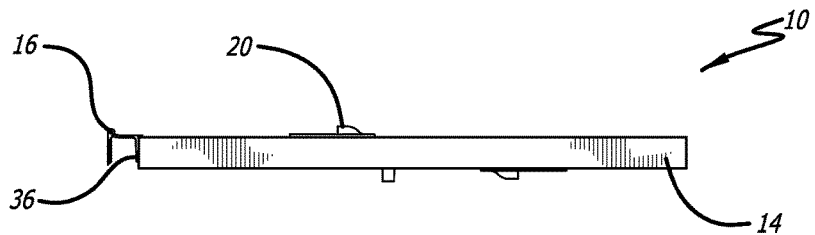
FIG. 2A is a top view of the telescoping panel door of the present invention in the extended, closed position.
Figure 2B:
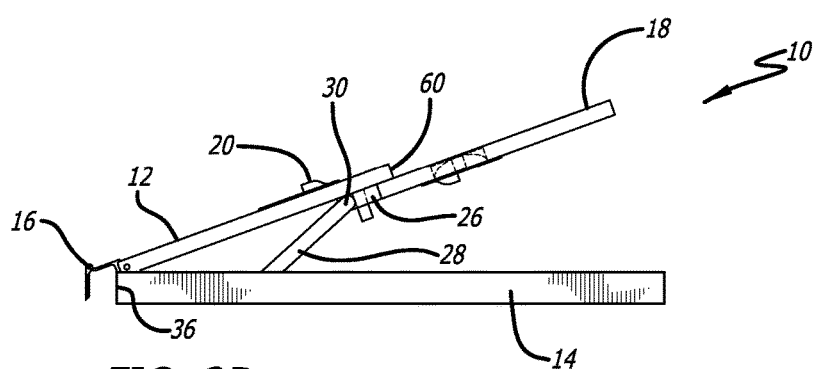
FIG. 2B is a top view of the telescoping panel door of FIG. 2A in a partially open position.
Figure 2C:
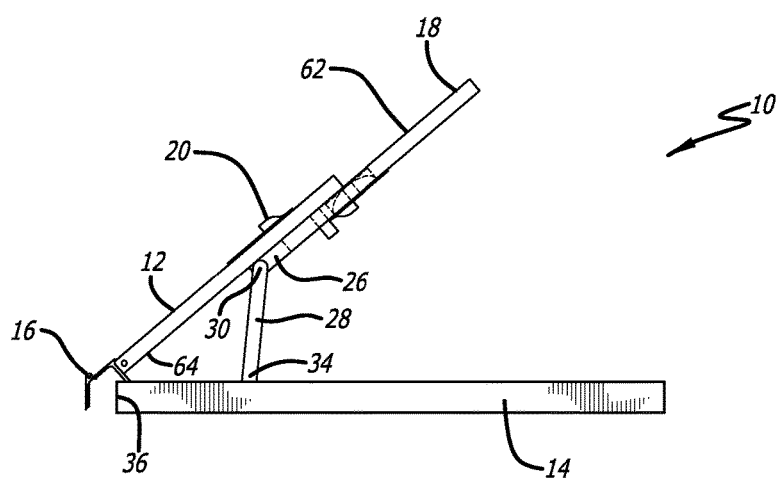
FIG. 2C is a top view of the telescoping panel door of FIG. 2A approximately half way open.
Figure 2D:
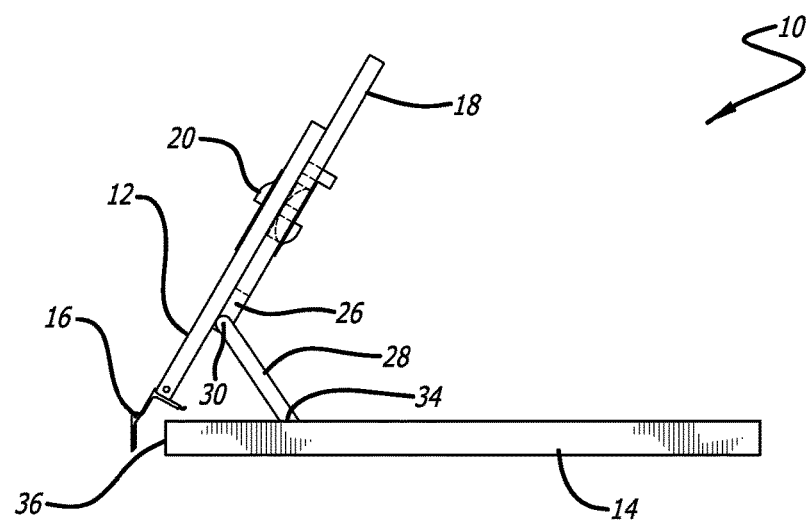
FIG. 2D is a top view of the telescoping panel door of FIG. 2A in a substantially open position.
Figure 2E:
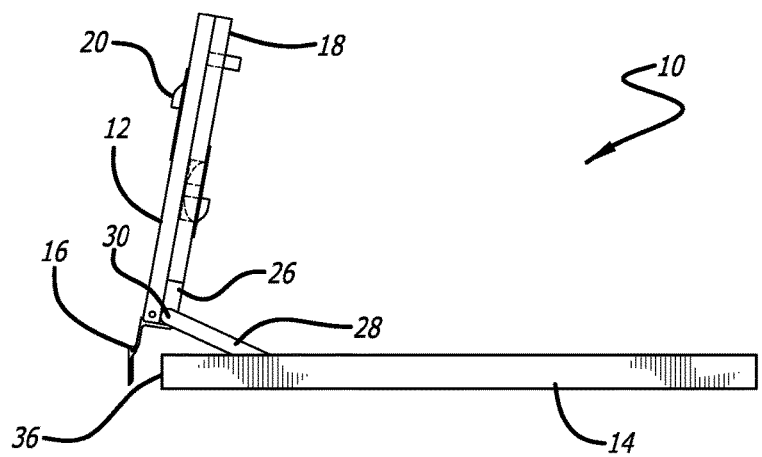
FIG. 2E is a top view of the telescoping panel door of FIG. 2A in the fully open position.

FIG. 2 shows a sequence of the two panels 12,18 as the door 10 transitions from fully closed in FIG. 2A to fully open in FIG. 2E. In the first frame (FIG. 2A), the telescoping door 10 is fully closed and lies in the plane of the doorway. The depth (or thickness) of the door 10 is a single panel for the entire door's length except for where the two panels are joined together, creating space on both sides of the door itself. In the second frame (FIG. 2B), the door 10 is slightly ajar as it begins to open.

One can see that the first panel 12 is hinged to the door frame 14 and moves in a predictable arc about the hinged connection. However, the second panel 18 is prevented from following the same arc due to the fixed connection of the inner edge 32 with the door frame via the linkage 28. As a result, the second panel 18 is retracted or constrained along the first panel 12 within the horizontal grooves or slots 22,24, and the door "shortens" in length as a result.

In the third frame (FIG. 2C), the door 10 is approximately half way open and the second panel 18 is further withdrawn or retracted into the first panel as the door continues to shorten. The fixed connection of the linkage 28 at the second panel 18 pulls the second panel along the first panel 12 such that the combined width (negating overlap) of the first and second panels is effectively halved.

In the fourth frame (FIG. 2D), the first panel 12 is opened more than half way, and the second panel 18 has almost completely moved in alignment with the first panel such that the door's width is significantly reduced. Finally, in the last frame, the linkage 28 has retracted the second panel 18 into complete alignment with the first panel 12 such that there is essentially no overlap between the two panels 12,18. The width of the door 10 now coincides with the width of the first panel 12 as the second panel 18 is hidden behind the first panel. When used as a lavatory door, for example, the telescoping door of the present invention when closed extends only approximately half way into the lavatory as compared with a traditional door, yielding greater mobility and comfort to the occupant without any loss of function.

Figure 3:
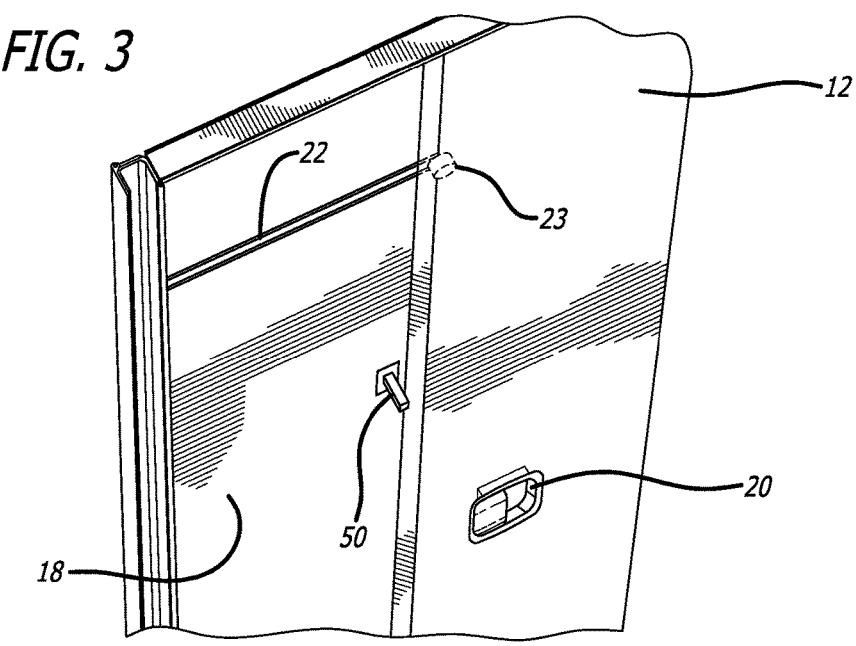
FIG. 3 is an elevated, perspective view of the first and second panels.

FIG. 3 illustrates the first and second panels 12,18 in the closed (extended) position. The horizontal slot 22 in the first panel is shown, and the wheel 23 or other engagement mechanism is shown in shadow that couple the two panels 12,18 together. A pivoting extension 50, such as a coat hook, can be positioned just adjacent the edge of the second panel. When the extension 50 is seated inside the first panel 12, the second panel 18 is free to slide back and forth as shown in FIG. 2 as the door transitions from opened to closed. However, with the extension pivoted out of the plane of the first panel 12, the second panel 18 is blocked from sliding across the surface of the first panel 12 by the interference of the extension 50. Thus, a reliable and efficient locking mechanism can be formed using a dual purpose coat hook 50 or the like.

Figure 4:
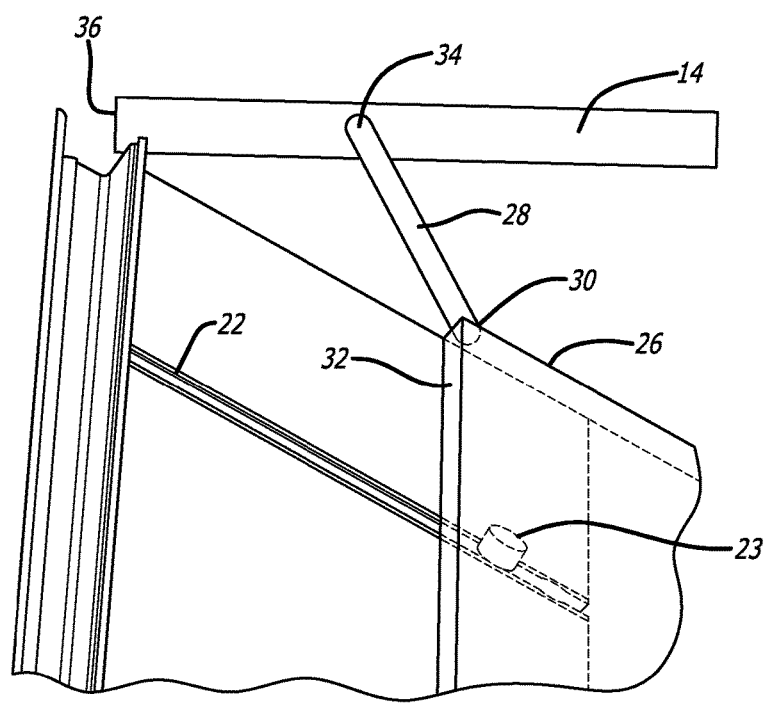
FIG. 4 is a perspective view looking upward at the linkage between the second panel and the door frame.

FIG. 4 illustrates the linkage 28 between the second panel 18 and the door frame 14. The linkage 28 connects the second panel 18 at a top edge 26 with a pin or other mechanical arrangement that allows for rotation of the linkage 28 about the connection so that the linkage can track the second panel 18 as it rotates around the primary hinge 16. The bar, rod, or other structure that forms the linkage 28 is connected to the door frame 14 or an immediate adjacent location by a similar pivoting coupling that allows for the linkage 28 to swivel at the fixed location. As the door 10 opens, the linkage 28 limits the travel of the second panel 18 from the fixed connection point of the bar, thereby causing the second panel 18 to slide along the horizontal grooves 22, 24 from an extended position to a retracted position as the first panel 12 swings in an arc away from the fixed connection point. In this manner, the length of the door 10 automatically shortens to (roughly) half of its extended length in the open position.

The horizontal grooves or slots 22, 24 on the first panel 12 establish tracks or raceways that permit a smooth rolling or sliding motion across their surfaces, so that the second panel 18 can move easily and freely along the first panel. This is particularly important where there is only one linkage 28 maneuvering the second panel 18 at the top 26 of the door 10, because friction or sticking of the track will cause issues with torquing or twisting of the panels with a resultant loss of effectiveness.

The result is a two panel door for an aircraft compartment that has a first panel hingedly connected to a door frame, the first panel having a width of approximately half of a door frame to which it is mounted, and a second panel mounted on the first panel for sliding translation thereon, the second panel extending parallel to the first panel in a sliding arrangement. The first panel is coupled to the door frame via a hinge and the second panel is coupled to the door frame via a linkage, the linkage fixing a distance that the second panel can extend from the door frame as the first panel swings about its hinged connection is a circular arc. The two panel door operates such that the ends of the panels 60,32 are adjacent in the closed configuration and the faces 62,64 of the panels 12, 18 are adjacent to each other in the open configuration.

It will be apparent from the foregoing that while particular forms of the invention have been illustrated and described, various modifications can be made without departing from the spirit and scope of the invention. Accordingly, it is not intended that the invention be limited, except as by the appended claims.

The invention claimed is:

1. A telescoping panel door for an aircraft compartment, comprising:
a first panel configured for hinged connection to a vertical surface of a door frame;
a second panel defining a fixation point;
a linkage fixing a distance that the second panel can extend from the vertical surface of the door frame, the linkage extending from a first end to a second end, the first end fixed to a fixed location on the door frame, the second end fixed to the fixation point of the second panel, wherein the second panel is configured for connection to a horizontal surface of the door frame via the linkage; and
a telescoping mechanism comprising an engagement structure of the first panel configured for sliding translation with a complementary structure of the second panel;
wherein the telescoping panel door, upon installation to the door frame, operates such that
in a closed configuration, a vertical edge of the first panel is adjacent to a vertical edge of the second panel, and
in an open configuration, a compartment-facing surface of the first panel is adjacent to an exterior-facing surface of the second panel.

2. The telescoping panel door of claim 1, wherein one of the engagement structure and the complementary structure comprises a wheel, and the other of the engagement structure and the complementary structure comprises a track along which the wheel is configured to move.

3. The telescoping panel door of claim 2, wherein the track comprises two horizontal grooves.

4. The telescoping panel door of claim 1, wherein, upon installation, a width of the first panel extends one half the width of the door frame.

5. The telescoping panel door of claim 1, wherein the second panel comprises a handle.

6. The telescoping panel door of claim 1, further comprising an extendable locking mechanism on the first panel to prevent the second panel, in the closed configuration, from slidably retracting against the first panel.

7. The telescoping panel door of claim 6, wherein the extendable locking mechanism is configured to function as a coat hook.

8. The telescoping panel door of claim 1, wherein the linkage fixes a hinged arc in which the first panel is configured to swing.

9. A telescoping panel door for an aircraft compartment, comprising:

a means for pivoting a first panel in relation to a vertical surface of a door frame;

a means for slideably translating a second panel along the first panel; and a means for pivotably connecting the second panel to a horizontal surface of the door frame, the means for pivotably connecting the second panel extending from (1) a first end attached to a fixed location on the second panel such that a position of the first end relative to the fixed location is constant as the second panel is slideably translated along the first panel, to (2) a second end attached to a fixed location on the door frame;

wherein the telescoping panel door, upon installation to the door frame, operates such that in a closed configuration, the first panel is adjacent to the second panel, in an open configuration, the first panel is parallel to the second panel, and in opening the telescoping panel door from the closed configuration to the open configuration, the first panel is pivoted by the means for pivoting, while the means for pivotably connecting limits travel of the second panel from a fixed connection point on the horizontal surface of the door frame, causing the second panel to slide along the means for slideably translating parallel to the first panel.

10. The telescoping panel door of claim 9, wherein the means for slideably translating comprises a wheel and a track along which the wheel is configured to move.

11. The telescoping panel door of claim 10, wherein the track comprises two horizontal grooves.

12. The telescoping panel door of claim 9, wherein, upon installation, a width of the first panel extends one half the width of the door frame.

13. The telescoping panel door of claim 9, further comprising a means for opening the telescoping panel door, wherein the means for opening is mounted to the second panel.

14. The telescoping panel door of claim 13, wherein the means for opening comprises a release lever.

15. The telescoping panel door of claim 9, further comprising a means for locking the telescoping panel door by preventing the second panel, in the closed configuration, from slidably retracting against the first panel.

16. The telescoping panel door of claim 15, wherein the means for locking comprises a pivoting extension mounted proximate the edge of the first panel adjacent, in the closed configuration, to the second panel.

17. The telescoping panel door of claim 16, wherein the pivoting extension, upon extension, functions as a coat hook.

18. The telescoping panel door of claim 9, wherein the means for pivotably connecting comprises a linkage including a pivoting connector and a bar.

19. The telescoping panel door of claim 9, wherein the means for pivoting comprises a piano hinge.

20. The telescoping panel door of claim 9, wherein the telescoping panel door, upon installation to the door frame, operates such that in the closed configuration, a vertical edge of the first panel is adjacent to a vertical edge of the second panel, and in the open configuration, a compartment-facing surface of the first panel is adjacent to an exterior-facing surface of the second panel.

* * * * *